(12) United States Patent
Zanoli et al.

(10) Patent No.: US 6,554,058 B2
(45) Date of Patent: Apr. 29, 2003

(54) GLASSMAKING FURNACE REGENERATOR

(75) Inventors: Alain Zanoli, Avignon (FR); Yves Boussant-Roux, Avignon (FR); Olivier Citti, Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 09/985,817

(22) Filed: Nov. 6, 2001

(65) Prior Publication Data
US 2002/0053417 A1 May 9, 2002

(30) Foreign Application Priority Data
Nov. 7, 2000 (FR) .............................. 00 14257

(51) Int. Cl.[7] .............................................. F23L 15/02
(52) U.S. Cl. .................... 165/9.1; 165/9.2; 65/135.1
(58) Field of Search ................... 165/9.1, 9.2, 9.3; 65/134.4, 135.1

(56) References Cited

U.S. PATENT DOCUMENTS

| | | | | |
|---|---|---|---|---|
| 1,361,709 A | * | 12/1920 | Cast ............................ | 165/9.1 |
| 1,836,412 A | * | 12/1931 | Trinks ......................... | 165/9.2 |
| 3,326,541 A | * | 6/1967 | Davis et al. .................. | 165/9.1 |
| 4,092,140 A | * | 5/1978 | Cerutti et al. ................ | 65/99 |
| 4,256,173 A | * | 3/1981 | Tsai et al. .................... | 165/9.3 |
| 4,328,020 A | * | 5/1982 | Hughes ........................ | 65/134.4 |
| 4,372,770 A | * | 2/1983 | Krumwiede et al. ......... | 65/134.4 |
| 4,599,100 A | * | 7/1986 | Demarest, Jr. ............... | 65/134.4 |
| 4,651,810 A | * | 3/1987 | Triessnig ..................... | 165/9.2 |
| 5,807,418 A | * | 9/1998 | Chamberland et al. ..... | 65/134.4 |
| 5,827,341 A | * | 10/1998 | Whitfield et al. ........... | 65/134.1 |
| 6,332,340 B1 | * | 12/2001 | Bodelin et al. .............. | 65/134.4 |

FOREIGN PATENT DOCUMENTS

FR    2 756 820    6/1998

* cited by examiner

Primary Examiner—Henry Bennett
Assistant Examiner—Terrell McKinnon
(74) Attorney, Agent, or Firm—Young & Thompson

(57) ABSTRACT

The invention relates to a glassmaking furnace regenerator including a stack of several rows of refractory members defining a plurality of channels, characterized in that the stack comprises, in the hot gas flow direction, a first zone at the hot gas inlet, for rapidly cooling the hot gases, a second zone, or central zone, for condensing and trapping chemical species liable to generate dust, and a third zone, at the cooled gas outlet, for evacuating condensates, the rows of stacked refractory members constituting said central zone including at least two adjacent rows whose channels have a projected surface area at least 20% less than those of the channels of the first and third zones.

9 Claims, 1 Drawing Sheet

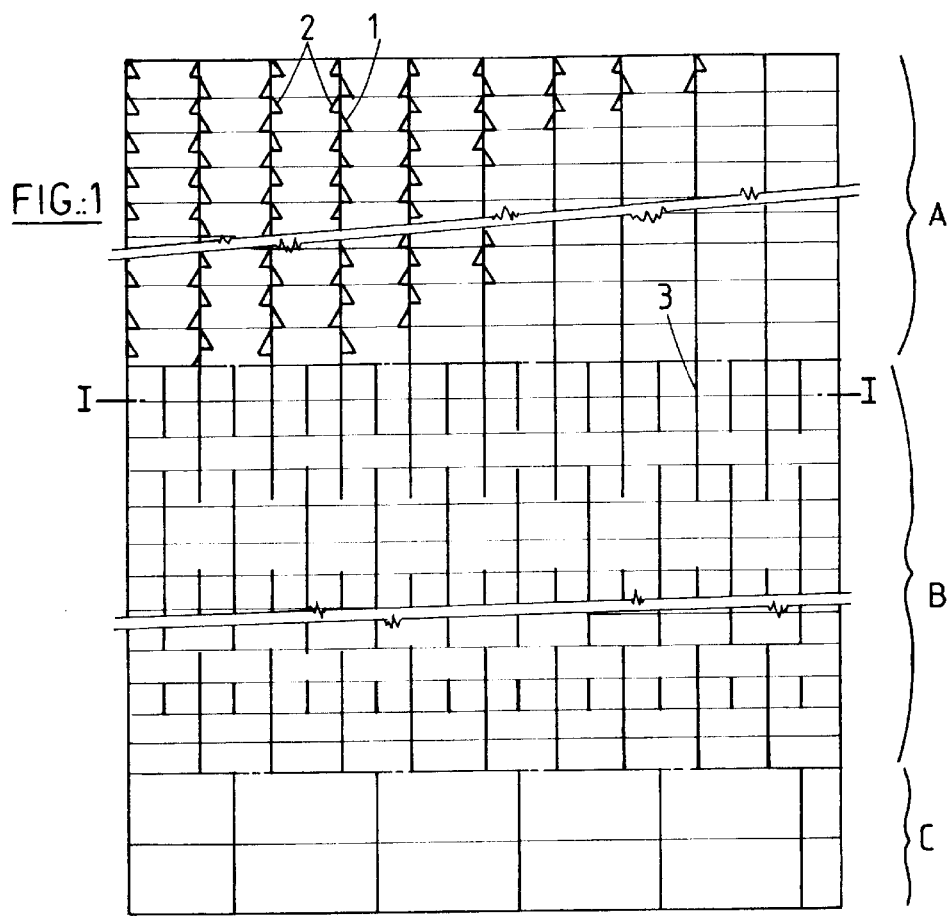
FIG.:1
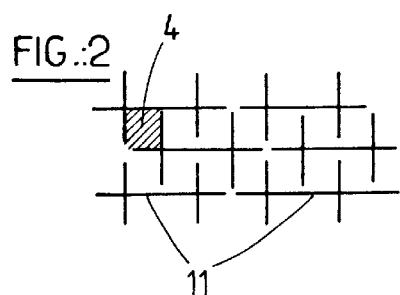
FIG.:2
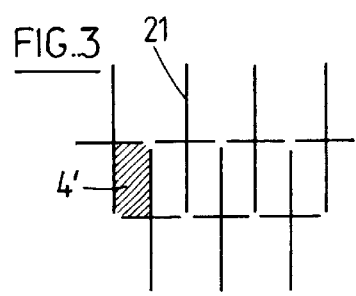
FIG.:3
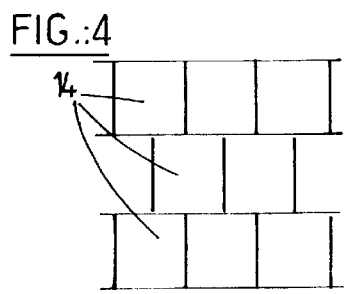
FIG.:4
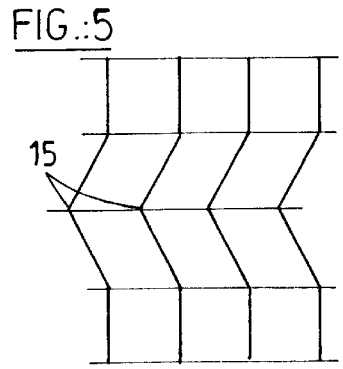
FIG.:5

GLASSMAKING FURNACE REGENERATOR

FIELD OF THE INVENTION

The invention relates to a glassmaking furnace regenerator simultaneously providing a device for trapping impurities present in the gaseous effluents in order to reduce the emission of dust.

BACKGROUND OF THE INVENTION

Most so-called flame glassmaking furnaces, that is to say those having gas or oil burners as the source of energy, are equipped with regenerators. The regenerators comprise a succession of chambers filled with ceramic members forming a stack and recovering and restoring the heat in cycles. The hot gases or flue gases coming from the operating furnace enter the stack, generally at the top of the regenerator, and deliver their heat energy into the stack. During this time, cool air is fed into the bottom of another stack heated during the preceding cycle to recover the heat energy; that air is hot when it leaves the top of the stack, from which it is conveyed to the burners of the furnace in order to ensure combustion of the fuel under the best possible conditions.

Furnaces for melting glass produce large quantities of gaseous effluents. Dust is formed in these effluents as they are cooled between the inlet and the outlet of the regenerators. The term "dust" refers to particulate emissions, that is to say any organic or inorganic substance in solid form (with no size limit) or in liquid form (droplets).

The dust essentially arises from the condensation of chemical species coming from the evaporation and recombination of substances present in the bath of glass during manufacture. It is also caused by the presence of impurities in the fuels. To a lesser degree, it also comes from flying raw materials in solid form.

The person skilled in the art knows that some of the dust, in greater or lesser amounts depending on the operating conditions of the furnace, can be deposited on entering the regenerators. Such deposits tend to block the passages for the flue gases and air. Until now, designers have always attempted to design stacks that limit this blocking phenomenon.

FR-A-2756820 proposes a method of selectively heating conventional stacks in order to unblock parts blocked by deposits of dust.

At present, the applicable standards in many countries are aimed at regulating and increasingly severely reducing particulate emissions.

Accordingly, glass manufacturers are obliged to study new ways to reduce particulate emissions from furnaces for melting glass.

Several solutions are used at present.

That most widely used is the electrostatic precipitator. This type of device collects the great majority of particulate emissions, but has serious drawbacks. The investment and operating costs of such equipment are very high. Also, the equipment is rapidly damaged by the acid gases and treating these gases before they enter the filter is therefore recommended, which represents an additional constraint.

Bag filters and, more generally, membrane filters are also used. They also collect the great majority of particulate emissions but have the same drawbacks as the device described above. Moreover, this type of filter operates at a low temperature, which necessitates cooling the flue gases before treating them in the filter. Finally, adding an auxiliary filter system leads to problems with controlling the operation of the furnace, because of the resulting head losses.

There is therefore a requirement for a device for reducing the dust emitted in the flue gases from glassmaking furnaces that is efficient and does not have the drawbacks of existing systems.

SUMMARY OF THE INVENTION

The invention aims to satisfy this requirement by proposing a regenerator that simultaneously acts as a device for trapping impurities present in the gaseous effluents from glassmaking furnaces and thereby limits the formation of dust and thus recourse to an auxiliary filter system.

The requirement is satisfied by a regenerator stack having an arrangement that favors, optimizes and controls condensation of the species generating dust on the surface of the refractory parts constituting the stack, which obviously retains its heat exchanger function.

To be more precise, the invention provides a glassmaking furnace regenerator including a stack of several rows of refractory members defining a plurality of channels, characterized in that the stack comprises, in the hot gas flow direction, a first zone at the hot gas inlet, for rapidly cooling the hot gases, a second zone, or central zone, for condensing and trapping chemical species liable to generate dust, and a third zone, at the cooled gas outlet, for evacuating condensates, the rows of stacked refractory members constituting said central zone including at least two adjacent rows whose channels have a projected surface area at least 20% less than those of the channels of the first and third zones.

The expression "projected surface area of the channels" means the largest surface area delimited by the refractory walls as seen in plan view. For example, reducing the size of the channels or offsetting the channels over two successive rows reduces the projected surface area of the channels. The projected surface area reduction must be at least 20% for a significant effect to be obtained.

By "row" is meant a storey or layer of stack members.

The stack of this regenerator is advantageously formed, at least in part, by electrofused cruciform stackable members.

For research purposes, we have developed a device for evaluating the quantity of dust contained in the flue gases on an industrial site. It comprises a water-cooled stainless steel sampling pipe. It extracts in an isokinetic manner a representative sample of the flue gases flowing in the stacks under controlled sampling conditions. The solid particles are collected on a filter and the gas flow passes through a series of washing flasks containing appropriate absorption solutions. Analyses of the filtrate and the washing solutions quantify the dust concentration already formed and the concentrations of species in the form of vapor liable to generate dust. The device can be used throughout the range of temperatures and speeds encountered in the stacks and therefore to monitor changes between the top and the bottom of a regenerator chamber.

Studying the dust collected on the filter has confirmed that the dust from glassmaking furnaces comprises very small particles (size less than one micrometer), of which by far the greatest part consists of sodium sulfate (especially if the glass being manufactured is an alkali-lime glass). The sodium sulfate is the result of the reaction between $Na_2O$ in the vapor state (resulting from the evaporation of species from the bed of raw materials and above the bath of glass itself) and $SO_2$ from the fuel and the raw materials. It condenses at temperatures below approximately 1 100° C. and then solidifies when the flue gases are cooled to below approximately 900° C. These steps occur during cooling of the flue gases and therefore in the regenerators, when regenerators are used.

The $SO_2$ and the sodium oxide are in gaseous form at the stack inlet. Because of the cyclic operation of the stack, the temperature of the refractory materials is lower than that of the flue gases. A temperature gradient is therefore established between the flue gases at the center of the channel and the flue gases in contact with the refractory walls. As soon as the temperature of the stack members falls below the temperature at which sodium sulfate condenses, condensation on the surface of the refractory members begins. Then, when the temperature of the flue gases becomes substantially equal to the temperature at which sodium sulfate condenses, the latter condenses spontaneously in the form of a mist at the center of the channel. Some of the droplets constituting that mist are deposited on the refractory walls. When the temperature of the flue gases falls below the temperature at which sodium sulfate solidifies, the droplets change from the liquid state to the solid state.

Our measurements on various industrial furnaces have enabled us to devise and validate the above dust formation mechanism.

Consequently, we are essentially interested in sodium sulfate dust; the phenomena demonstrated also occur for other species (sulfates, chlorides, borates of alkali and alkaline-earth metals), although at significantly different temperatures.

It therefore appeared to us that, to reduce the amount of dust emitted when using regenerator stacks, the stacks must be capable of maximizing the condensation on the refractory materials constituting the stack of chemical species liable to generate dust.

The object of the invention is to provide different solutions enabling this objective to be achieved. Unlike conventional regenerators, in which the whole of the stack is entirely for transferring heat, stacks in accordance with the invention all have three zones, each of which has a specific role. The first zone encountered by the flue gases is a zone aiming to condition the flue gases so that the efficiency of the central zone is maximized. Thus it is a question in particular of maintaining the species generating dust in vapor form and obtaining a flue gas temperature greater than but close to the temperature at which these species condense. This fast thermal conditioning must leave more room for the central zone in which the trapping phenomena actually occur. The various possible configurations of the central zone are intended to intensify the condensation and then deposition of droplets on the surface of the stack members.

The third and final zone is designed to facilitate the natural or forced evacuation of condensates and other deposits flowing by gravity from the preceding zones.

The stacks of the invention can be made with all conventionally used types of sintered or fused refractory members. The examples given in this application refer to various cruciform electrofused members for filling regenerator chambers manufactured and sold by the Société Européenne des Produits Réfractaires (SEPR). These products are perfectly suitable for this application because they feature a very low reactivity vis à vis alkaline vapor contained in the flue gases and are very resistant to high temperatures and to thermal cycling imposed by the operation of the regenerators. Also, the specific surface area of heat exchange of these members is high, which favors heat exchange and achieves very high regeneration efficiency. Also, the electrofused refractory material constituting the cruciform members from SEPR is particularly able to withstand cleaning the stacks by heat treatment.

The following description and the various diagrams explain the invention in more detail.

DESCRIPTION OF THE DRAWINGS

FIG. 1 is a diagrammatic view in vertical section of a regenerator stack according to the invention.

FIG. 2 is a view of part of the central zone of a regenerator stack in accordance with the invention in section taken along the line I—I in FIG. 1.

FIG. 3 is a view similar to that of FIG. 2 but showing a different embodiment of a regenerator stack according to the invention.

FIG. 4 is a diagrammatic view in vertical section showing the central zone of another embodiment of a stack according to the invention.

FIG. 5 is a diagrammatic view in section showing the central zone of a further embodiment of a stack according to the invention.

All the figures are to the same scale where the width of the channels is concerned.

DETAILED DESCRIPTION

FIG. 1 shows a stack with the three zones A, B and C.

In the hot zone A, that is to say in the first zone encountered by the flue gases, cruciform refractory members 1 are used that feature obstacles or corrugations 2 like those described in EP-B-354844. Their thermal efficiency is very high. There is a great temperature difference between the flue gases and the refractory walls. This zone therefore reduces the temperature of the flue gases rapidly to the temperature at which condensation begins. For this zone, any part or arrangement of parts having a very high thermal efficiency is suitable. As in existing stacks, it is also necessary for the parts to be highly resistant to very high temperatures and to atmospheres charged with aggressive chemical species. The height of the zone A depends on how the furnace is operated (draught, excess of air, etc.), and in particular on the temperature and the flow rate with which the flue gases reach the stack.

SEPR Type 3 and Type 6 smooth cruciform members 3 are used in the central zone B. Diverse arrangements of the members in the rows are used throughout this zone, in order to create many transition zones. The transitions can be due to changes in the type of member (changes between Type 3 and Type 6), the offsetting of members of the same type, or the presence of obstacles on the walls of the refractory members. The various parts of zone B illustrate these possibilities. The flow of flue gases is disturbed by these transitions, which intensifies the transfer of mass between the flue gases and the stack parts. The beginning of the central zone B consists of two successive rows for which the global projected surface area (i.e. that allowing for both rows) of the channels is reduced relative to that of the hot zone A. The end of the central zone is marked by the presence of two successive rows for which the global projected surface area is equal to or greater than that of the hot zone. Within the central zone, channels of the same width as in the hot zone can be used periodically, or not, precisely to favor these transition effects. Accordingly, in one row, the projected surface area can be equal to that of the hot zone, although over the whole of the rows constituting the central zone the projected surface area is less than that of the hot zone. The at least local reduction in size of the channels of the central zone characterizes the stack of the regenerator according to the invention. It is preferable for more than half the rows of the central zone contribute to reducing the global projected surface area of the central zone. These "active" rows must have a minimum cumulative height of one meter for the effects obtained to be significant. Any other arrangement able to intensify the mechanisms of transfer to the wall of species generating dust, in particular any arrangement creating transition areas to favor the transfers of mass, could equally be suitable for the central zone B (corrugated parts, offsetting of the channels, provision of obstacles, etc.).

The same members are used in the cold zone C as in the central zone B, but the channels are wider to favor the flow of condensates. This avoids the problem of blocking by the accumulation of fixed condensates. Any other member or arrangement of members enabling evacuation of the condensates by natural flow could equally be suitable.

In one embodiment of the invention, the cold zone C can consist of parts that are particularly resistant to the thermal cycles and shocks (regardless of their shape and arrangement). In this embodiment, condensates could be evacuated by heating the stack, using techniques known to the person skilled in the art. Through regular control, thermal unblocking could be initiated when the accumulation of condensates or dust become sufficient to impede the flow of flue gases. Chemical or mechanical unblocking could of course be substituted for thermal unblocking.

Designs favoring natural flow and thermal unblocking can of course be used in combination.

FIG. 2 shows a stack with smaller channels than those of zone A in FIG. 1. The shaded zone 4 in FIG. 2 represents the projected surface area of the channel. It is beneficial to have smaller channels because this very significantly increases the surface area of exchange between the flue gases and the stack members. This is made possible by using double cruciform members 11, i.e. members obtained by joining two simple cruciform members at the end of one of their branches, and a new arrangement of these double cruciform members in a row, whereby the members of two adjacent lines within a given row are offset by one half-length. The use of double cruciform members also has other advantages: it makes the stack more stable and facilitates transitions between the various zones.

FIG. 3 shows an embodiment in which the channels 4' are rectangular because cruciform members 21 are used with two opposite branches shorter than the other two branches. Compared to square section channels like those shown in FIG. 2, this increases the surface area of exchange between the flue gases and the stack members, which intensifies condensation. Any other member or arrangement of members increasing the surface area on which species liable to generate dust are deposited satisfies the requirements of the central zone B and is also within the scope of the invention.

FIG. 4 shows a further embodiment in which the channels 14 are periodically offset from one row to the next. This type of solution maximizes the temperature difference between the flue gases and the refractory material because of the offsetting of the channels. Increasing the temperature difference favors the transport of species to the wall and therefore intensifies the deposition of species generating dust. Also, this offset arrangement increases the level of turbulence, which also intensifies deposition.

FIG. 5 shows a stack in which the channels feature a discontinuous profile marked by a change of flow direction 15. Cruciform members in which two of the branches are inclined can be used to obtain this discontinuity. Depending on the angle of inclination of the branches, and therefore of the break in the stack, the surface area of exchange between the flue gases and the stack members can be increased by from 4 to 13% (for an angle of 45°). This increase in the exchange surface area increases condensation on the walls. This type of design, and in particular the discontinuous surface of the channels, also has the advantage of disturbing the flow of flue gases, which also encourages greater transfer of mass between the flue gases and the stack members.

The embodiments described show various principles for maximizing the transport to the refractory walls of chemical species liable to generate dust, with a view to intensifying the deposition of those species on the walls of the members constituting the stack. These embodiments also minimize the risk of blocking and retain good thermal efficiency. These stacks can also be cleaned by heat treatment.

The invention is not limited to the specific examples described; combinations of embodiments described by way of example or of other parts or embodiments are also within the scope of the invention.

What is claimed is:

1. A glassmaking furnace regenerator including a stack of several rows of refractory members defining a plurality of channels, characterized in that the stack comprises, in the hot gas flow direction, a first zone at the hot gas inlet, for rapidly cooling the hot gases, a second zone, or central zone, for condensing and trapping chemical species liable to generate dust, and a third zone, at the cooled gas outlet, for evacuating condensates, the rows of stacked refractory members constituting said central zone including at least two adjacent rows whose channels have a projected surface area at least 20% less than those of the channels of the first and third zones.

2. A regenerator according to claim 1, characterized in that the stacked refractory members constituting the first zone have a surface featuring obstacles.

3. A regenerator according to claim 1, characterized in that the central zone consists of rows whose refractory members are offset from one row to the next in order to disturb the flow of gases.

4. A regenerator according to claim 1, characterized in that more than half the rows of the central zone contribute to reducing the global projected surface area of the central zone.

5. A regenerator according to claim 1, characterized in that the channels of the central zone feature at least one change of direction.

6. A regenerator according to claim 1, characterized in that the channels of the third zone have a cross section at least as large as that of the channels of the central zone.

7. A regenerator according to claim 1, characterized in that the surfaces of the refractory members that constitute the rows of the central zone and which are intended to be in contact with hot gases are substantially smooth.

8. A regenerator according to claim 1, characterized in that the stacked refractory members are cruciform members.

9. A regenerator according to claim 1, characterized in that the stacked refractory members are made from an electrofused refractory material.

* * * * *